sible sides of the wall of the hole 24 are held in position by a nut 28 threaded upon the valve stem 29, the latter being provided with the usual valve (not shown).

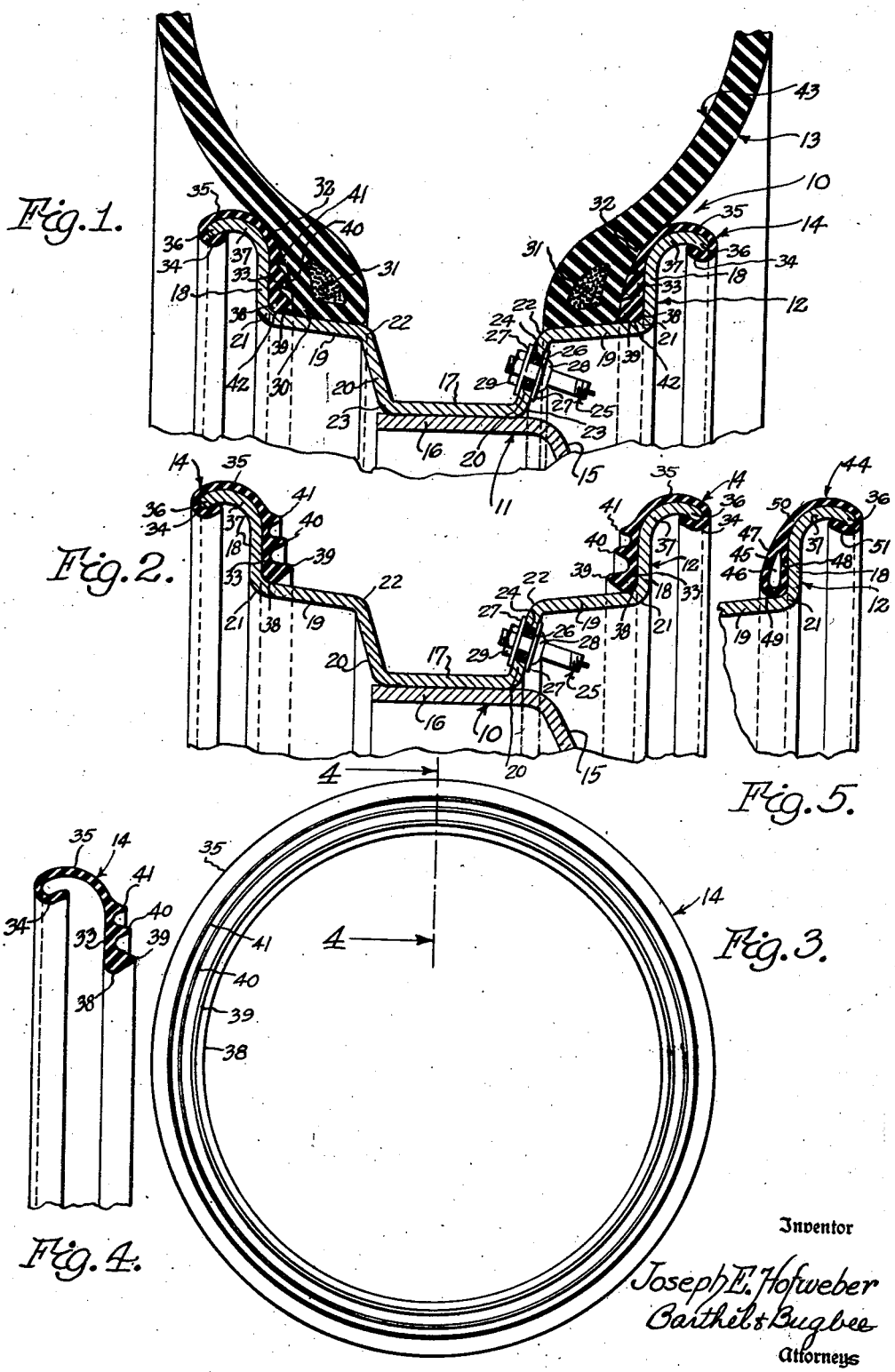

United States Patent Office
2,709,472
Patented May 31, 1955

2,709,472

TUBELESS TIRE SEALING DEVICE

Joseph E. Hofweber, Detroit, Mich.

Application March 31, 1951, Serial No. 218,563

4 Claims. (Cl. 152—330)

This invention relates to vehicle tires and, in particular, to tubeless tires wherein the conventional inner tube is omitted and the tire or so-called casing itself is directly inflated.

Another object of this invention is to provide a sealing device to be inserted between a conventional tire and rim so as to make their junction airtight and thereby permit direct inflation of the tire without the need for the usual inner tube and without the necessity for providing a special tire construction.

Another object is to provide a tubeless tire sealing device of the foregoing character wherein the device consists of an annular resilient member of such a shape as will fill in certain of the spaces between the tire and the rim and effect airtight sealing engagement therebetween.

Another object is to provide a tubeless tire sealing device of the foregoing character wherein the device consists of an annular resilient member of elastic deformable material such as rubber, synthetic rubber or the like and preferably has a portion overhanging and engaging the edge of the rim so as to hold the device firmly in position, the device optionally having yieldable ribs thereon or an air chamber therein permitting such yielding.

Another object of the invention is to provide a modified tubeless tire sealing device of the foregoing character wherein the rim on each side is provided with an annular groove adjacent the turn of the rim where the bead of the tire or casing normally engages the rim, and a tubular sealing member is seated in each of the two grooves thus provided, this tubular member containing an air chamber which permits a certain amount of yielding of the tubular member while effecting sealing engagement between the bead of the tire and the rim.

Another object is to provide a tubeless tire sealing device of the foregoing character which will prevent accidents on the road resulting from the defects of conventional inner-tube tires, and which will effect large savings in the amount of rubber hitherto used in such tires.

Another object is to provide a tubeless tire sealing device of the foregoing character which is immune to the presence or accumulation of foreign matter between the casing and the rim, such as dirt or rust, and which also prevents loss of air whether from such foreign matter or from distortion of the rim such as when it is bent or dented.

In the drawings:

Figure 1 is a fragmentary cross-section through a rim and the adjacent portion of a vehicle wheel provided with a conventional tire or casing in inflated condition and equipped with sealing devices according to one form of the invention;

Figure 2 is a cross-section similar to Figure 1 but with the tire or casing removed, showing the manner in which the ribs on the sealing device regain their original positions;

Figure 3 is a side elevation on a reduced scale of one of the sealing devices shown in Figures 1 and 2;

Figure 4 is an enlarged cross-section through the sealing device shown in Figures 1 to 3 inclusive taken along the line 4—4 in Figure 3;

Figure 5 is a fragmentary cross-section of a portion of a vehicle wheel rim equipped with a modification of the sealing device shown in Figures 1 to 4 inclusive;

Figure 6:
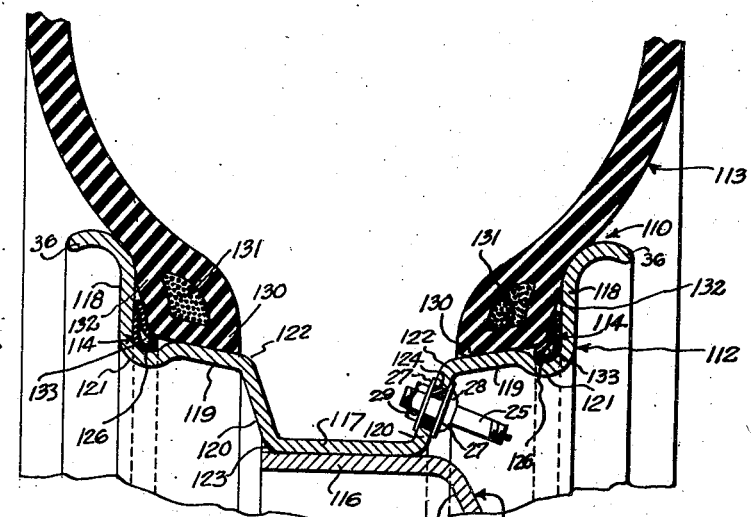
Figure 6 is a fragmentary cross-section through a modified rim and the adjacent portion of a vehicle wheel provided with a conventional tire or casing in inflated condition and equipped with a further modification of the sealing devices shown in Figures 1 to 5 inclusive.

Hitherto, numerous disadvantages have been associated with the use of the inner tubes with which conventional vehicle tires or casings have long been equipped. Where, as heretofore, the inner tube has carried the entire charge of compressed air for sustaining the load of the vehicle, a puncture or cut resulting from a nail or other sharp object penetrating the tire casing caused the inner tube to deflate by permitting the air to leak out between the tire casing and the rim. This often ruined the tube by causing multiple holes from the successive penetrations and withdrawals of the nail on each revolution of the wheel before the driver detected the occurrence of the puncture and brought the vehicle to a halt, too late to prevent irreparable damage to the tube. For this reason, such an occurrence required the replacement of the tube. Furthermore, even where the damage was not irreparable, the necessity of removing the tire casing from the rim in order to patch the punctured tube was a disagreeable and time-consuming task. Moreover, on replacing of the tube in the casing and the casing in the rim, the tube often became inadvertently pinched between the tire and the rim, tearing a hole in the tube upon subsequent inflation and use, and causing the air in the tube to blow out or leak out between the tire and the rim. Special tubeless tires with sealing ribs on their side walls have been devised but these have involved special molding techniques. The sealing ribs on such tires are also frequently damaged by the use of conventional tire tools in removing the tire from the rim, and when this occurs, the tire can no longer be inflated.

The present invention provides for the use of conventional tires or casings in conventional rims and seals the joints between them by a special annular resilient sealing device, so that the conventional tire or casing may be inflated upon its conventional rim, assuming, of course, that the inflation valve has been properly installed and sealed in the rim. A modification of the invention provides special grooves at the turn of the rim which receives resilient annular sealing members in the form of endless tubes.

Referring to the drawings in detail, Figures 1 to 4 inclusive show a vehicle tire and wheel assembly or unit, generally designated 10, consisting of a conventional wheel 11 provided with a conventional rim 12 and tire or casing 13 and equipped with a sealing device 14, according to one form of the invention. The wheel 11 consists of the usual disc-like body portion 15 (only the outer portion being shown) which is bolted to the wheel hub in the usual way. The body portion 15 has a peripheral annular flange 16 which is welded or otherwise secured to the so-called base flange 17 or central portion of the rim 12. The rim 12 is of the usual drop center type having peripheral side flanges 18, intermediate flanges 19 and inner flanges 20 bent relatively to one another at bends or turns 21, 22 and 23 respectively. The rim 12 is provided with a hole 24 through which the inflation valve 25 projects and is sealed by a gasket or resilient washer 26 filling the space between the valve 25 and the wall of the hole 24. Washers 27 on opposite sides of the rim portion 20 cooperating with an enlargement 28 on the valve stem and a nut 29 threaded thereon hold the valve 25 in air-tight sealed relationship relative to the rim 12.

The tire or casing 13 of which only a portion is shown, is of conventional construction and is of the so-called "straight side" type, with which automobiles are usually equipped. Each side of the tire or casing 13 has a so-called bead 30 which fits against the horizontal flanges 19 and in the ordinary installation also fits against the vertical or radial flanges 18 at the turns 21 of the rim 12. In the present invention, however, the sealing device 14 is interposed between the tire or casing bead 30 and the radial or vertical rim flange 18, as described below. The tire beads 30 are also ordinarily equipped with the annular stranded wire endless cables 31 which strengthen them and prevent their pulling away from the rim 12 to an undesired extent.

The sealing device 14 is mounted on each side of the tire or casing 13 against the bead 30 and adjacent side wall 32 of the tire or casing 13 and extends downward into the turn 21 of each side of the rim 12. The sealing device 14 (Figures 3 and 4) consists of an annular or ring-like member of elastic deformable material such as rubber, synthetic rubber, resilient plastic or the like having an inner flange portion 33 and an outer flange portion 34 interconnected by a portion 35 of arcuate cross-section. The outer flange portion 34 is bent inwardly and reversely relatively to the connecting portion 35 and is adapted to extend around the edge 36 of the outwardly curved periphery 37 of the rim flange 18. The inner portion 33 of the sealing device 14 is approximately in the form of a ring having a rounded inner edge 38 and approximately concentric ribs 39, 40 and 41 formed on its inner side and projecting inwardly toward the tire bead 30 and the adjacent side wall 32 of the tire casing 13. The connecting portion 35 of arcuate cross-section is curved to fit closely against the curved periphery 37 of the rim flange 18.

In the use of the invention, after the tire or casing 13 is installed on the rim 12, a pair of sealing devices 14 is mounted upon the outer rim flange 18 on opposite sides of the wheel 11. The sealing device 14, being of resilient material, is distorted and pulled until its inner portion 33 passes over the outer or vertical rim flange 18 and its curved periphery 37 and comes to rest in the approximately right-angled groove 42 formed by the flanges 18 and 19 at the turn 21 thereof. The curved portion 38 fits into this groove 42 and the curved portion 35 of arcuate cross-section hugs the curved periphery 37 of the rim flange 18 while the sealing device outer flange 34 fits around the edge 36 thereof. The beads 30 of the casing 13 and their adjacent side walls 32 press against the horizontal rim flanges 19 and the sealing device ribs 39, 40 and 41.

Assuming that the inflation valve 25 has been previously installed in the hole 24 in the rim 12 and sealed in the manner described above, the operator then applies the nozzle of the tire inflation hose to the valve 25 and inflates the air chamber 43 within the interior of the tire or casing 13. As the pressure rises within the air chamber 43 of the tire or casing 13, the beads 30 thereof are pressed outward by the force resulting from this inflation, causing the side wall 32 to bend the ribs 39, 40 and 41 of the sealing devices 14, as shown in Figure 1. The engagement of the side wall 32 with the ribs 39, 40 and 41 and the adjacent curved connecting portion 35 of the sealing device 14 establishes a sealing of the junction therebetween and prevents the escape of air. As a consequence, the tire or casing 13 remains inflated because the compressed air in the chamber 43 is effectively prevented from escaping at the only location presented for such escape, namely at the periphery of the rim 12.

The modified sealing device, generally designated 14, shown in Figure 5 is also of annular or ring-shaped form and has a hollow inner portion 45 containing an air chamber 46 with outer and inner walls 47 and 48 connected by a rounded curved or edge portion 49 and merging outwardly into the connecting portion 50 which is adapted to extend around the periphery 37 and edge 36 of the rim 12 and terminates in a flange portion 51 similar to the flange portion 34 of the sealing device 14. The air chamber 46 is preferably continuous and air-tight by being completely sealed, so that it retains the air or other gas which is inside it.

The modified sealing devices 44 are installed in a similar manner to the sealing devices 14 as described above and the tire or casing 13 then placed on the rim 12 by the use of the usual tools. Inflation is accomplished in the same manner as described above in connection with the sealing device 14 and the consequent expansion and outward motion of the tire beads 30 and their side walls 32 against the outer wall 47 of the inner portion 45 contracts the air chamber 46 and effects a resilient sealing engagement which prevents the leakage of air from the tire air chamber 43.

Figure 7:
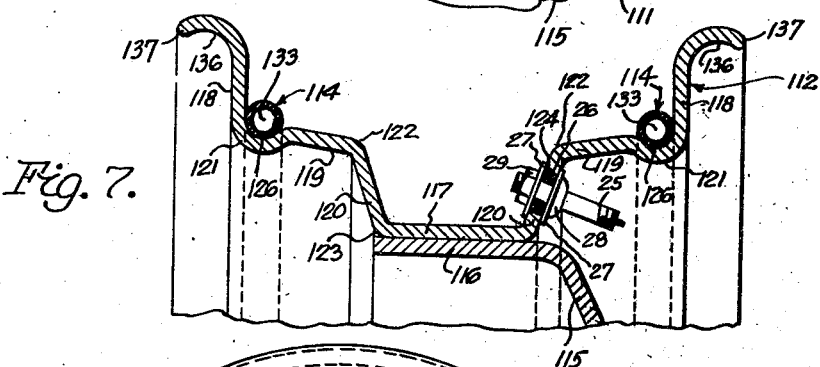
Figure 7 is a cross-section similar to Figure 6 but with the tire or casing removed, showing the sealing devices restored to their original positions.
Figure 8:
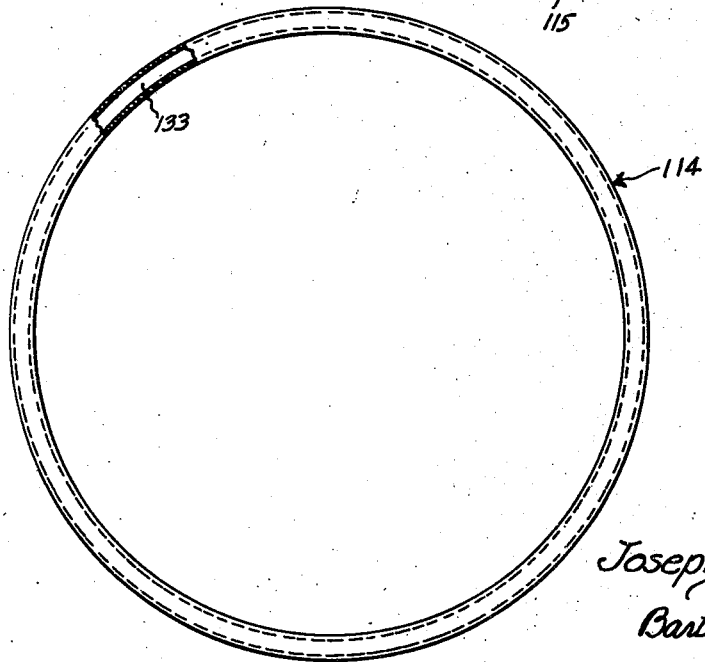
Figure 8 is a side elevation on a reduced scale of one of the sealing devices shown in Figures 6 and 7.

The modification shown in Figures 6 to 8 inclusive employs a wheel and tire assembly 110 consisting of a conventional wheel 111 provided with a conventional rim 112 and tire or casing 113, these being equipped with a modified sealing device 114, according to another form of the invention. The wheel 111 has the central disc-like body portion 115, peripheral flange 116 welded to the base flange 117 of the rim 112. The rim 112 is also of the drop center type generally similar to the rim 12 of Figures 1 and 2 and similarly provided with peripheral side flanges 118, intermediate flanges 119 and inner flanges 120 bent relatively to one another at turns or bends 121, 122 and 123 respectively. The rim 112 is also provided with a hole 124 which is equipped with a similar inflation valve 25 as the rim 12 of Figure 1 and similarly sealed, corresponding parts bearing the same reference numeral. At the outer turns or bends 121, the rim 112 is provided with an annular groove 126 which is of approximately arcuate cross-section and which receives the sealing devices 114 (Figure 7). The tire or casing 113 is also of the conventional "straight side" type shown in Figure 1 having beads 130 and endless stranded wire cables 131 therein and side walls 132.

The modified sealing device 14 is in the form of an annular endless tubes (Figure 8) of elastic deformable material such as rubber, synthetic rubber, resilient plastic or the like having a hollow annular air chambers 133 preferably though not necessarily of circular cross-section and containing a gas such as air which is sealed against escape.

In the use of the modified sealing device 114, a pair of such devices is mounted in the annular grove 126 at the turn or bend 121 of the rim 112 by pulling or otherwise distorting or stretching the devices 114 until they pass over the peripheral portions 136 and 137 of the rim 112. The tire or casing 113 is then installed in the usual manner by the use of conventional tools so that the beads 130 of the casing 113 and their adjacent side walls 132 press against the rim flanges 118 and 119 and against the sealing devices 114 lodged in the annular grooves 126 therebetween. The tire 113 is then inflated by applying the nozzle of the tire inflation hose to the valve 25, causing the beads 130 to press outward (Figure 6), deforming the sealing devices 114 so that they are no longer of their original cross-section but of an elongated cross-section as shown in Figure 6. This establishes a sealing engagement between the rim flanges 118 and the beads 130 and side walls 132 of the tire 113, preventing the escape of air and consequently retaining the tire or casing 113 in its inflated condition.

What I claim is:

1. The combination with a vehicle tire and a vehicle wheel rim having relatively-angled approximately horizontal and vertical outer flanges on its opposite sides forming a pair of annular recesses receiving the opposite beads of the tire, of a pair of yieldable annular sealing members of resilient material disposed in said recesses between said tire beads and said rim flanges and sealing the junction therebetween, said sealing members having peripheral flanges extending reversely around and embracing the peripheral edges of said rim.

2. The combination with a vehicle tire and a vehicle wheel rim having relatively-angled approximately horizontal and vertical outer flanges on its opposite sides forming a pair of annular recesses receiving the opposite beads of the tire, of a pair of yieldable annular sealing members of resilient material disposed in said recesses between said tire beads and said rim flanges and sealing the junction therebetween, said sealing members having peripheral flanges extending reversely around and embracing the peripheral edges of said rim, each of said sealing members having an air chamber therein.

3. The combination with a vehicle tire and a vehicle wheel rim having relatively-angled approximately horizontal and vertical outer flanges on its opposite sides forming a pair of annular recesses receiving the opposite beads of the tire, of a pair of yieldable annular sealing members of resilient material disposed in said recesses between said tire beads and said rim flanges and sealing the junction therebetween, said sealing members having peripheral flanges extending reversely around and embracing the peripheral edges of said rim, each of said sealing members having an annular air chamber therein.

4. A sealing device for tubeless tires having rim-engaging beads thereon comprising an annular body of resilient material having an annular rib on the tire-bead-engaging surface thereof and projecting laterally from the side thereof engageable with the tire bead, said body having an annular flange portion of arcuate cross-section with an annular reversely bent edge adapted to extend reversely around and embrace the peripheral edge of the wheel rim flange.

References Cited in the file of this patent
UNITED STATES PATENTS

| | | |
|---|---|---|
| 482,182 | Lungren | Sept. 6, 1892 |
| 607,043 | James | July 12, 1898 |
| 612,981 | Welch | Oct. 25, 1898 |
| 1,459,377 | Peeples | June 19, 1923 |
| 1,653,054 | Mack | Dec. 20, 1927 |
| 1,842,315 | Conigrave | Jan. 19, 1932 |
| 1,966,580 | Bull | July 17, 1934 |
| 2,394,290 | Butler | Feb. 5, 1946 |
| 2,409,666 | Comey | Oct. 22, 1946 |
| 2,563,787 | Keefe | Aug. 7, 1951 |

FOREIGN PATENTS

| | | |
|---|---|---|
| 345,879 | France | Nov. 2, 1904 |